United States Patent [19]

Dieckow

[11] Patent Number: 5,788,733
[45] Date of Patent: Aug. 4, 1998

[54] DEVICE FOR THE SHAPING OF GLASS TUBES

[75] Inventor: Bernhard Dieckow, Berlin, Germany

[73] Assignee: Hans-Joachim Dichter, Berlin, Germany

[21] Appl. No.: 656,352

[22] PCT Filed: Dec. 22, 1994

[86] PCT No.: PCT/DE94/01540

§ 371 Date: Jun. 18, 1996

§ 102(e) Date: Jun. 18, 1996

[87] PCT Pub. No.: WO95/17352

PCT Pub. Date: Jun. 29, 1995

[30] Foreign Application Priority Data

Dec. 23, 1993 [DE] Germany .................. 43 44 936.0

[51] Int. Cl.⁶ ...................... C03B 23/045; C03B 23/09
[52] U.S. Cl. ...................... 65/292; 65/108; 65/109;
65/276; 65/278; 65/293; 65/297; 65/DIG. 9;
72/121; 72/122
[58] Field of Search .................. 65/108, 109, 102,
65/111, 87, 268, 276, 278, 279, 280, 286,
292, 293, 297, DIG. 9; 72/84, 85, 112,
120, 121, 122

[56] References Cited

U.S. PATENT DOCUMENTS

| | | | |
|---|---|---|---|
| 2,392,104 | 1/1946 | Smith | 65/109 |
| 3,171,730 | 3/1965 | Zauner | 65/109 |
| 3,360,352 | 12/1967 | Sundstrom et al. | 65/297 |
| 4,055,977 | 11/1977 | Haswell | 72/84 |
| 4,144,732 | 3/1979 | Franks et al. | 72/84 |
| 4,441,908 | 4/1984 | Zauner | 65/108 |
| 4,830,654 | 5/1989 | Dichter | 65/108 |
| 5,300,134 | 4/1994 | Mannl et al. | 65/109 |

FOREIGN PATENT DOCUMENTS

| | | |
|---|---|---|
| 1796100 | 2/1972 | Germany . |
| 3613212 | 7/1987 | Germany . |
| 41-5103 | 3/1966 | Japan ............... 65/DIG. 9 |

*Primary Examiner*—Steven P. Griffin
*Attorney, Agent, or Firm*—Mark P. Stone

[57] ABSTRACT

In a device for shaping glass tubes (32), the shaping tools (3, 4), which are designed as shaping rollers, are mounted on a rotary table (2) that encloses the glass tube (32) and that rotates at a speed that is several times higher than the speed of rotation of the glass tube (32). The shaping tools (3,4) are moved in a perpendicular direction to the longitudinal axis (40) of the glass tube (32) in order to shape it. The relatively high speed of rotation of the rotary table (2) allows the advance of the shaping tools per rotation of the rotary table (2) and at the same time the forces that act on the softened part of the glass tube (32) to be kept small.

10 Claims, 1 Drawing Sheet

DEVICE FOR THE SHAPING OF GLASS TUBES

The invention relates to a device for the shaping of glass tubes, with at least one shaping tool which can be set in rotational movement and which can be pressed against the circumference of the softened glass tube, in order to produce a contraction of the glass tube, said contraction corresponding to the profile of said shaping tool.

In glass processing machines for producing small bottles from glass tubes, devices of the above type are used for shaping the necks of the bottles. In a relevant device known from DE 17 96 100 B2, the shaping tools formed by a pair of shaping rollers are held by jib arms which are pivotable to and fro in opposite directions and which, during the shaping process, are moved towards the longitudinal axis of the glass tube in such a way that the latter is gripped in a pincer-like manner by the shaping rollers. As soon as contact occurs between the glass tube and the shaping rollers, these are taken up by the glass tube held in a rotating clamping chuck and are set in rotational movement, the final rotational speed of the shaping rollers being determined by the rotational speed of the glass tube, narrow limits being placed on said rotational speed, as is known, in order to avoid a so-called whiplash effect. In the light of the circumstances described, during the shaping of the glass tube the work has to be carried out with comparatively long advances per revolution of the glass tube, since a lengthening of the processing times is out of the question, not only for economic reasons, but also because the cooling curve of the glass opposes it. The relatively long advances per revolution entail the disadvantage that normal and tangential forces are exerted on the softened part of the glass tube and may lead to undesirable deformations, that is to say to rejects being produced.

The object on which the invention is based is to provide a device of the relevant generic type, by means of which, whilst adhering to a processing time predetermined by the softening state of the glass, it is possible to shape a glass tube carefully and with high accuracy by means of short advances of the shaping tools per tube revolution. This object is achieved, according to the invention, in that the device has a turntable which rotates about the longitudinal axis of the glass tube during the shaping process and on which the shaping tool is mounted rotatably and so as to be displaceable perpendicularly to the longitudinal axis of the glass tube.

The device according to the invention makes it possible for the distance, over which the shaping operation takes place during a predetermined shaping time, to be increased markedly in comparison with known constructions, in that the rotational speed of the turntable is increased in relation to the rotational speed of the glass tube, in practise by 5 to 10 times, depending on the dimensions of the glass tube. Furthermore, it is even possible for processing to be carried out on a stationary glass tube.

Further details and features of the invention emerge from the subclaims, the accompanying drawing and its following description.

BRIEF DESCRIPTION OF THE DRAWING

The single drawing FIGURE illustrates, in section, an apparatus for shaping glass tubes, in accordance with the present invention.

The particularly advantageous device represented in the drawing has a turntable 2 which is arranged at the upper end of a drive shaft 1 designed as a hollow shaft and which carries two diametrically opposed shaping tools 3 and 4 designed as ballbearing-mounted profile rollers. The ball bearings 5 and 6 for the shaping tools 3, 4 are mounted on a cylindrical journal 7, the longitudinal axis 8 of which is offset relative to the longitudinal axis 9 of a shaft 10 by an amount which corresponds to half the possible total advance of the respective shaping tool 3 or 4. The cylindrical journal (7) is carried by the shaft 10. Connected fixedly in terms of rotation to the shaft 10 is a gearwheel 11 which meshes with a toothed ring 12 at the upper end of a sleeve 15 supported via ball bearings 13, 14 on the drive shaft 1. The gearwheel 11 imparts rotational movement to the shaft 10 carrying the cylindrical journal 7, and the toothed ring 12 at the upper end of the sleeve 15 surrounds the drive shaft 1 for the turntable 2. Arranged fixedly in terms of rotation on the drive shaft 1 and the sleeve 15 in each case is a toothed-belt pulley 16 and 17 which is connected via a toothed belt 18 or 19 in each case to a toothed-belt pulley 20 or 21, each of which can be set in rotational movement by a shaft 22 or 23. The shafts 22, 23 are mounted in eccentric bushes by means of ball bearings 24, 25, so that the tension of the respective toothed belt 18 or 19 can be adjusted by pivoting the eccentric bush 27 provided with an eccentric bore 26 by a specific angular amount in the receptacle 28 provided for it.

Figure 1:
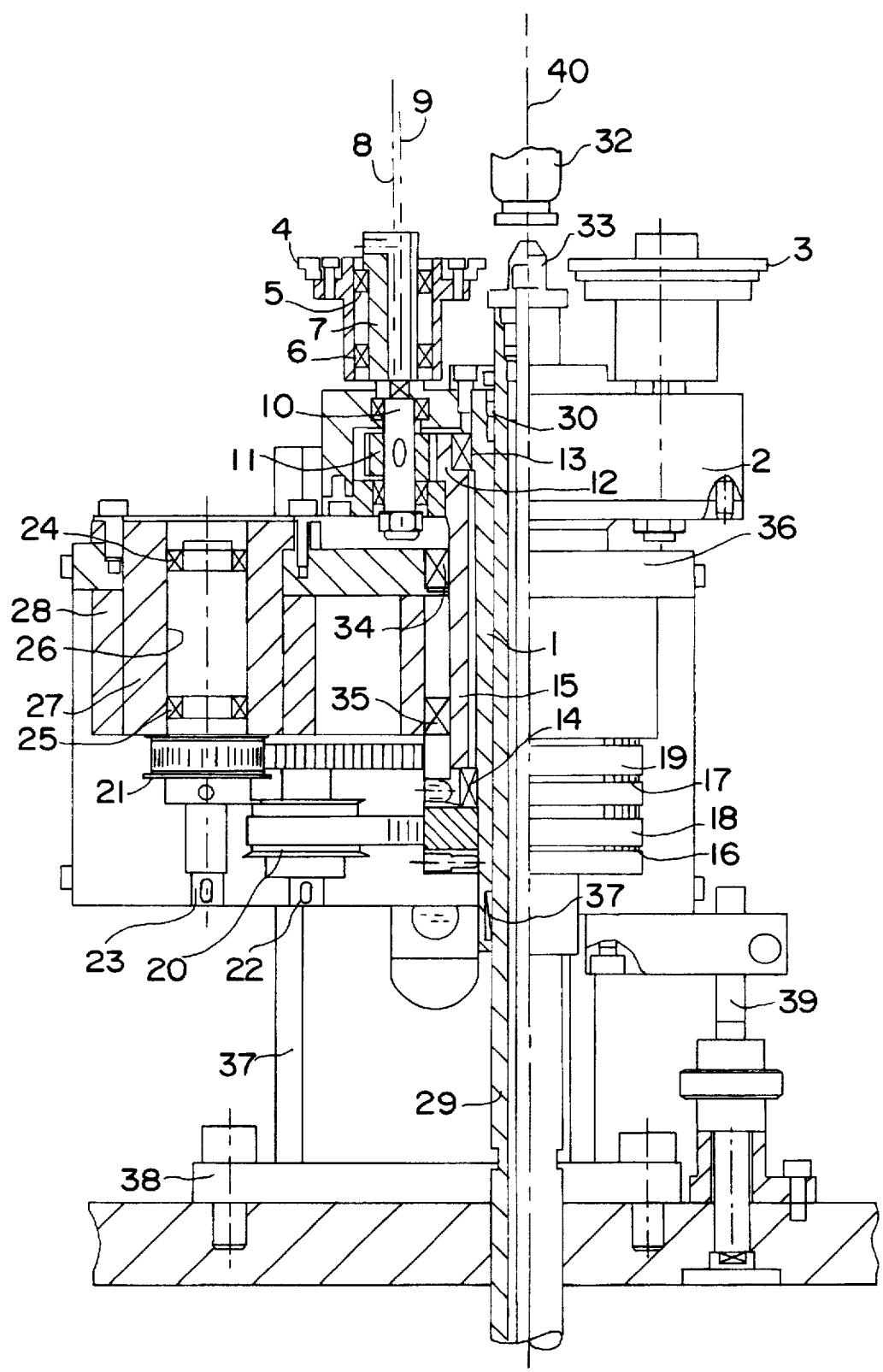

The drive shaft 1 surrounds a further hollow shaft 29, on which it is supported via bearings 30, 31. The further hollow shaft 29, which can be driven at a rotational speed equal to the rotational speed of the glass tube 32, carries, at its upper end, a mandrel 33 which, during the shaping of the lower end of the glass tube 32, penetrates into this and performs a supporting function.

The sleeve 15 capable of being driven via the toothed belt 19 is supported by ball bearings 34, 35 on a slide 36 which is guided on a column 37 and the height of which can be varied relative to the baseplate 38 of the column 37 by means of an adjusting device having a threaded spindle 39.

By virtue of the hitherto described design of the device, it is possible for the drive shaft 1 and the toothed ring 12 formed from part of the sleeve 15 to be driven at the same rotational speed. In this case, no relative movement takes place between the gearwheels 11 on the shafts 10 and the toothed ring 12. Relative movement occurs when the drive shaft 1 and the toothed ring 12 formed from part of the sleeve 15 rotate at different rotational speeds, and in order to bring about an advance of the shaping tools 3, 4 toward the longitudinal axis 40 of the glass tube 32 per revolution of the turntable 2 the difference in rotational speed can be extremely small. Accordingly, the rotational speeds of the drive shaft 1 and the toothed ring 12 differ from each other when the shaping tools 3, 4 are being displaced relative to the longitudinal axis 40 of the glass tube 32 and the rotational speeds of the drive shaft 1 and the toothed ring 12 are the same when the shaping tools 3, 4 are not being displaced relative to the longitudinal axis 40 of the glass tube 32. In practise, when the two shafts 22, 23 are driven by a common motor, the difference in rotational speed can be implemented mechanically by superposing movement onto a pivotable intermediate wheel, whilst, if separate drive motors are used, the same result can be achieved by means of electronic regulation of the motors.

It is important that the turntable 2 rotates at a far higher rotational speed than the glass tube clamped in a known way in a clamping chuck, and that an as it were "smooth" shaping of the glass tube into the neck of a small bottle can thereby take place, in that the advance of the shaping tools per revolution is kept small. The risk of harmful torsional stresses on the glass tube during shaping is eliminated, and shaping processes can be carried out on glass tubes with great rapidity and high accuracy. The division of the shaping process into segments assigned to a plurality of stations of a glass processing machine, said division normally being unavoidable when known devices are used, can normally be dispensed with, that is to say existing stations can be used for other purposes.

I claim:

1. A device for the shaping of glass tubes, said device comprising at least one shaping tool having a predetermined profile and which can be set in rotational movement and which can be pressed against the circumference of a softened glass tube in order to produce a contraction of the glass tube, said contraction corresponding to the profile of said shaping tool, and a turntable (2) which rotates about a longitudinal axis (40) of the glass tube (32) and on which the at least one shaping tool (3, 4) is mounted rotatably and displaceable perpendicularly to the longitudinal axis (40) of the glass tube (32).

2. The device as claimed in claim 1, wherein said at least one shaping tool (3, 4) is mounted rotatably on a cylindrical journal (7) which is carried by a shaft (10), the cylindrical journal having a longitudinal axis (8) which is offset, relative to a longitudinal axis (9) of the shaft (10) carrying it, by a distance corresponding to one half the maximum distance which said at least one shaping tool is displaceable perpendicularly to said longitudinal axis (40) of said glass tube (32).

3. The device as claimed in claim 2, wherein a gearwheel (11) for imparting a rotational movement to the shaft (10) is seated on the shaft (10) carrying the journal (7).

4. The device as claimed in claim 3, said device including a drive shaft (1) for rotating said turntable (2) and a toothed ring (12) surrounding said drive shaft (1), wherein the gearwheel (11) seated on the shaft (10) carrying the journal (7) meshes with said toothed ring (12) surrounding the drive shaft (1) for rotating the turntable (2).

5. The device as claimed in claim 4, said device including means for generating rotational movements for imparting rotational speeds to the drive shaft (1) for rotating the turntable (2) and to the toothed ring (12), the rotational speeds of said drive shaft and said toothed ring differing from each other when said shaping tool is being displaced relative to the longitudinal axis of said glass tube, and said rotational speeds of said drive shaft and said toothed ring being the same when said shaping tool is not being displaced relative to said longitudinal axis of said glass tube.

6. The device as claimed in claim 4, wherein the toothed ring (12) is formed by part of a sleeve (15) which is mounted rotatably on the drive shaft (1) for rotating the turntable (2), said drive shaft comprising a hollow shaft.

7. The device as claimed in claim 5, wherein the toothed ring (12) is formed by part of a sleeve (15) which is mounted rotatably on the drive shaft (1) for rotating the turntable (2), said drive shaft comprising a hollow shaft.

8. The device as claimed in claim 5 wherein said differing rotational speeds of said drive shaft for rotating the turntable and of the toothed ring is small in relation to the difference between rotational speeds of said drive shaft for rotating said turntable and a rotational speed imparted to said glass tube.

9. The device as claimed in claim 1, wherein a mandrel (33) capable of being introduced into an open end of the glass tube (32) is arranged in the center of the turntable (2).

10. The device as claimed in claim 1, wherein said device comprises two shaping tools (3, 4) mounted on said turntable and diametrically opposed to each other, each of said two shaping tools formed by profile rollers.

* * * * *